(12) United States Patent
Zhang et al.

(10) Patent No.: US 8,217,581 B2

(45) Date of Patent: Jul. 10, 2012

(54) INDUCTION LAMP WITH BRIGHTNESS ADJUSTMENT CAPABILITY

(75) Inventors: Bin Zhang, Shenzhen (CN); Xi-Qiang Yu, Shenzhen (CN)

(73) Assignees: Shenzhen Futaihong Precision Industry Co., Ltd., ShenZhen, Guangdong Province (CN); Chi Mei Communication Systems, Inc., Tu-Cheng, New Taipei (TW)

( * ) Notice: Subject to any disclaimer, the term of this patent is extended or adjusted under 35 U.S.C. 154(b) by 422 days.

(21) Appl. No.: 12/498,457

(22) Filed: Jul. 7, 2009

(65) Prior Publication Data

US 2010/0171443 A1    Jul. 8, 2010

(30) Foreign Application Priority Data

Jan. 7, 2009    (CN) .......................... 2009 1 0300102

(51) Int. Cl.
    *H05B 41/14*    (2006.01)
    *H05B 37/02*    (2006.01)
    *H05B 39/04*    (2006.01)

(52) U.S. Cl. .......................... 315/159; 315/248; 315/307

(58) Field of Classification Search .................. 315/159, 315/248, 291, 307, 111.51
See application file for complete search history.

(56) References Cited

U.S. PATENT DOCUMENTS

| | | | | |
|---|---|---|---|---|
| 5,561,351 A | * | 10/1996 | Vrionis et al. | ............... 315/248 |
| 7,843,148 B2 | * | 11/2010 | Gater et al. | ................... 315/291 |
| 2011/0193491 A1 | * | 8/2011 | Choutov et al. | ............... 315/291 |

* cited by examiner

*Primary Examiner* — Daniel D Chang

(74) *Attorney, Agent, or Firm* — Altis Law Group, Inc.

(57) ABSTRACT

An induction lamp includes a brightness control module, an induction unit, a register, and an illuminating unit. The brightness control module, the induction unit, the register, and the illuminating unit are electrically connected to each other in that order. When the induction unit detects a control signal from a user, the induction unit sends a detecting signal to change an address of the register, and the brightness control module controls a brightness of the illuminating unit depending on the address of the register.

8 Claims, 3 Drawing Sheets

INDUCTION LAMP WITH BRIGHTNESS ADJUSTMENT CAPABILITY

BACKGROUND

1. Technical Field

The present disclosure relates to an induction lamp, and particularly, to an induction lamp with a brightness adjustment capability.

2. Description of the Related Art

A typical infrared induction lamp includes an infrared induction unit, a control module, a switch, and an illuminating unit. The infrared induction unit, the control module, the switch and the illuminating unit are electrically connected in to each other in that order. An external power source is electrically connected to the illuminating unit via the switch to provide electrical power to the illuminating unit. The infrared induction unit is configured to detect infrared signals. When the infrared induction unit detects an infrared signal from a user, the infrared induction unit will send a detecting signal to the control module. The control module will control the switch to electrically connect with the external power source to turn on the illuminating unit when the control module receives the detecting signal. Likewise, when the infrared signal disappears or decreases, such as the user is away from the infrared induction lamp, the infrared induction unit will send a disconnecting signal to the control module. The control module will control the switch to disconnect with the external power source to turn off the illuminating unit, when the control module receives the disconnecting signal.

When the typical infrared induction lamp is turned on, the illuminating unit will emit strong light at its maximal power in a short time. However, when the typical infrared induction lamp is turned on in the dark, the strong light may cause discomfort to the eyes of the users.

Therefore, there is room for improvement within the art.

BRIEF DESCRIPTION OF THE DRAWINGS

Many aspects of the present induction lamp can be better understood with reference to the following drawings. The components in the drawings are not necessarily drawn to scale, the emphasis instead being placed upon clearly illustrating the principles of the present induction lamp. Moreover, in the drawings, like reference numerals designate corresponding parts throughout the several views.

DETAILED DESCRIPTION

Figure 1:
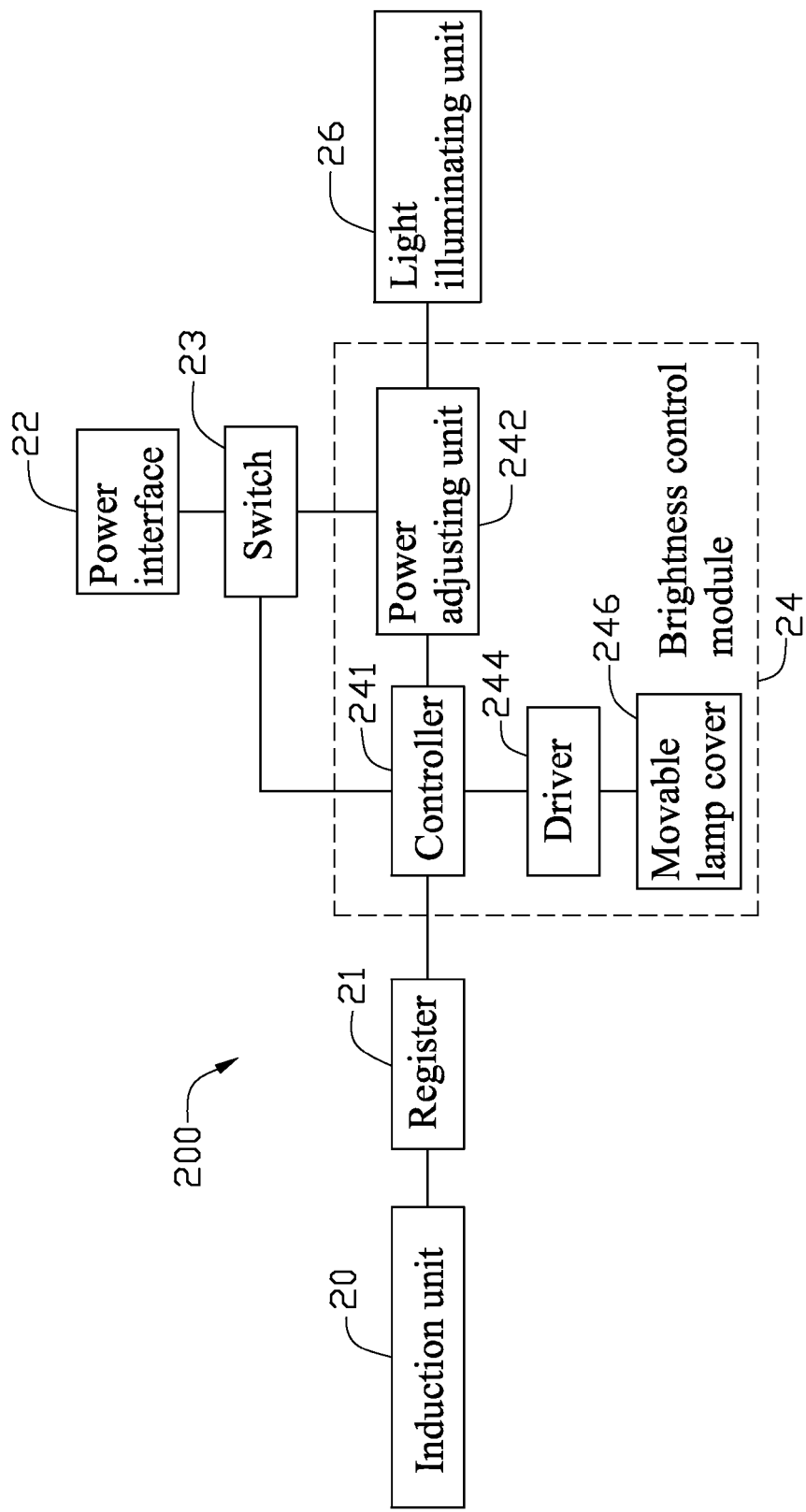
FIG. 1 is a chart of an embodiment of an induction lamp.

Referring to FIG. 1, an embodiment of an induction lamp 200 includes an induction unit 20, a register 21, a power interface 22, a switch 23, a brightness control module 24 and an illuminating unit 26. When the induction unit 20 detects an infrared signal from a user, the induction unit 20 sends a detecting signal to the register 21, the brightness control module 24 controls a brightness of the illuminating unit 26 depending on a state of the register 21.

The induction unit 20, the register 21, the brightness control module 24 and the illuminating unit 26 are electrically connected in that order. The power interface 22 is configured to be connected to an external power source (not shown). The switch 23 interconnects the brightness control module 24 and the power interface 22. The brightness control module 24 interconnects the switch 23 and the illuminating unit 26, such that the switch 23 can control the brightness control module 24 and the illuminating unit 26 to connect with the external power source or not.

In the illustrated exemplary embodiment, the illuminating unit 26 is an incandescent lamp unit. The induction unit 20 is an infrared induction unit. When the induction unit 20 detects an infrared signal adjacent to the induction lamp 200, the induction unit 20 will send a detecting signal to the register 21 to charge an address of the register 22 correspondingly.

The brightness control module 24 includes a controller 241, a power adjusting unit 242, a driver 244, and a movable lamp cover 246. The controller 241 is connected to the switch 23 and the register 21. The power adjusting unit 242 is connected to the controller 241, the switch 23, and the illuminating unit 26. The controller 241 is configured to control the switch 23 to control the external power source to provide electrical power to the illuminating unit 26 or not, depending on a state of the register 21. The power adjusting unit 242 is configured to adjust an electrical current or voltage to control the brightness of the illuminating unit 26. In the illustrated embodiment, the power adjusting unit 242 is a pulse modulation width (PMW) controller.

Figure 2:
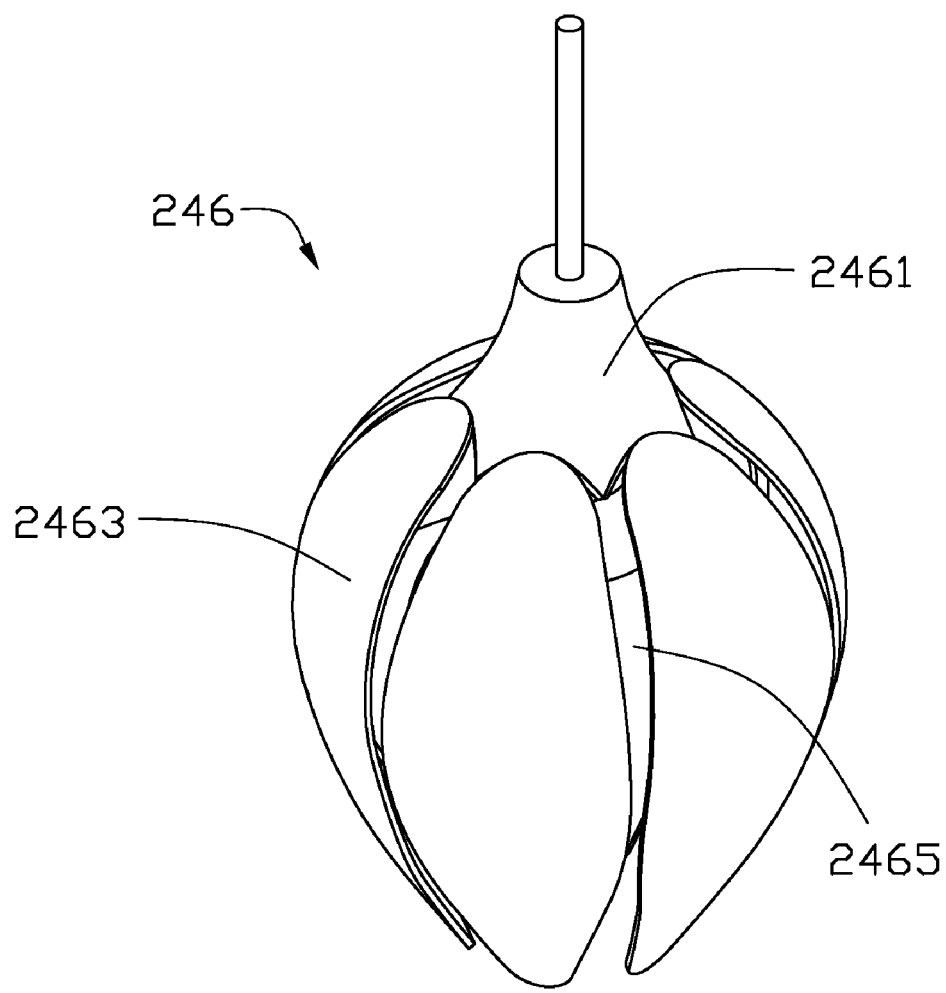
FIG. 2 is a closed, isometric view of the induction lamp of FIG. 1.
Figure 3:
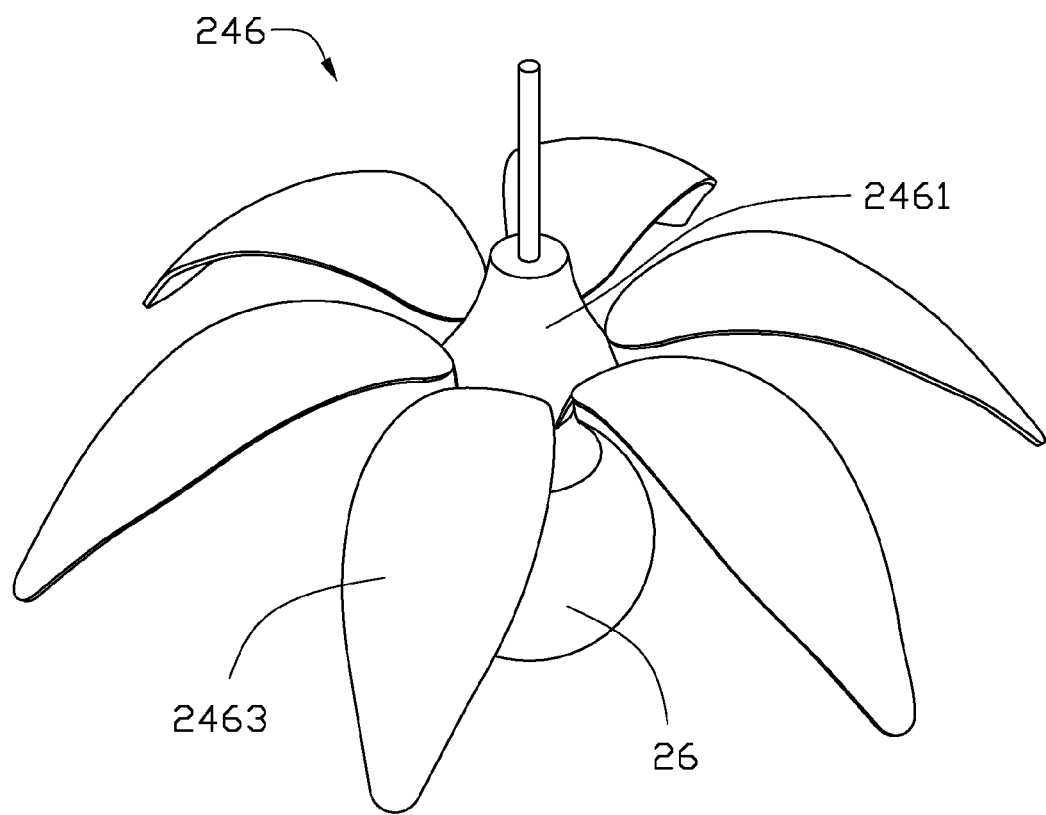
FIG. 3 is an opened, isometric view of the induction lamp of FIG. 1.

Referring to FIGS. 2 and 3, the movable lamp cover 246 includes a main body 2461 and a plurality of movable leaf-shaped sheets 2463. One end of each leaf-shaped sheet 2463 is rotatably fixed to the main body 2461 and the other end of each leaf-shaped sheet 2463 is free. The illuminating unit 26 is fixed to a bottom of the main body 2461, and is surrounded by the movable leaf-shaped sheets 2463. In a closed state, each two adjacent movable leaf-shaped sheets 2463 define a gap 2465 for the light from the illuminating unit 26 to pass through. The movable leaf-shaped sheets 2463 may be driven by the driver 244, such that the free end of each leaf-shaped sheet 2463 moves upward relative to the main body 2461 to expose the illuminating unit 26. In the illustrated embodiment, the driver 244 is a motor.

An exemplary working process of the induction lamp 200 may include the following steps. At the start of the process, the induction lamp 200 is in a closed state (see FIG. 2). In the closed state of the induction lamp 200, the switch 23 is closed. An address of the register 22 is "00". A PMW value of the power adjusting unit 242 is low. The illuminating unit 26 is turned off.

In a first step, the induction unit 20 searches for a control signal, such as an infrared signal sent by a user. When the induction unit 20 detects the control signal, the induction unit 20 will send a detecting signal to the register 21 to run step S2.

In a second step, the register 22 receives the detecting signal to change the address "00" of the register 22 to an address "01". The controller 241 controls the switch 23 to electrically interconnect the external power source and the illuminating unit 26 via the power interface 22, such that the illuminating unit 26 is turned on to emit light. Because the PMW value of the power adjusting unit 242 is low, the voltage of the illuminating unit 26 is low, and the movable lamp cover 246 is still closed. Thus, light from the illuminating unit 26 emits out via the gaps 2465 is relatively weak.

In a third step, the induction unit 20 detects whether or not there is a second control signal, such as a stronger infrared signal than the first control signal. If not, the induction lamp 200 remains functioning in the second step. If yes, the induction unit 20 will send a second detecting signal to the register 21 to run a fourth step. For example, the user walks adjacent to the induction lamp 200, the induction unit 20 detects a relatively strong infrared signal from the user.

In the fourth step, the register 21 receives the second detecting signal to change the address "01" of the register 22 to an address "10". The controller 241 controls the power adjusting unit 242 to increase the PMW value, such that a brightness of the illuminating unit 26 is progressively increased according to the PMW value.

In a fifth step, the induction unit 20 detects whether or not there is a third control signal, such as a stronger infrared signal than the second control signal. If not, the induction lamp 200 remains functioning in the fourth step. If yes, the induction unit 20 will send a third detecting signal to the register 22 to run a sixth step. For example, the user touches with the induction lamp 200.

In the sixth step, the register 22 receives the third detecting signal to change the address "10" of the register 22 to an address "11". The controller 241 controls the driver 244 to drive the movable lamp cover 246 to open, such that a brightness of the induction lamp 200 is largest.

In a seventh step, the induction unit 20 detects whether or not there is a fourth control signal, such if infrared signal still exists or has weaken. If not, the induction lamp 200 remains functioning in the sixth step. If yes, the induction unit 20 will send a fourth detecting signal to the register 22 to run an eighth step.

In the eighth step, the register 22 receives the fourth detecting signal to change the address "11" of the register 22 to the original address "00". The controller 241 controls the switch 23 to disconnect the external power source to turn off the illuminating unit 26.

It should be pointed out that the induction unit 20 can be an audio induction unit to detect a predetermined sound signal. The user can send a predetermined sound signal as a control signal to the induction unit 20. It should be pointed out that the power adjusting unit 242 can be a current control circuit to control a brightness of the illuminating unit 26.

In this embodiment, the user can easily control the brightness of the induction unit 20 to his/her comfort.

Finally, while the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure as defined by the appended claims.

What is claimed is:

1. An induction lamp, comprising: a brightness control module, an induction unit, a register, an illuminating unit and a switch connected to the brightness control module, wherein the brightness control module, the induction unit, the register, and the illuminating unit are electrically connected to each other in that order; when the induction unit detects a control signal from a user, the induction unit sends a detecting signal to change an address of the register, and the brightness control module controls a brightness of the illuminating unit depending on the address of the register, the brightness control module comprises a controller connected to the switch and the register respectively, the controller controlling the switch to connect to an external power source or disconnect to the external power source depending on the address of the register; the brightness control module further comprises a driver connected to the controller, and a movable lamp cover connected to the driver; the controller control the driver to open or close the movable lamp cover depending on the address of the register.

2. The induction lamp of claim 1, wherein the driver is a motor.

3. The induction lamp of claim 1, wherein the movable lamp cover comprises a main body and a plurality of movable leaf-shaped sheets; the illuminating unit is fixed to a bottom of the main body, and is surrounded by the movable leaf-shaped sheets; one end of each leaf-shaped sheet is rotatably fixed to the main body and the other end of each leaf-shaped sheet is free, and can be driven by the driver to open to expose the illuminating unit.

4. The induction lamp of claim 3, wherein in a closed state, each two adjacent movable leaf-shaped sheets define a gap for the light from the illuminating unit to pass through.

5. An induction lamp, comprising:
an illuminating unit;
a register;
an induction unit connected to the register, the induction unit detecting a control signal from a user and sending a detecting signal to change an address of the register; and
a brightness control module, the brightness control module comprising a controller, a driver, and a movable lamp cover connected in series, the controller connected to the register and the light illuminating unit, the controller controlling the driver to open or close the movable lamp cover depending on the address of the register.

6. The induction lamp of claim 5, wherein the driver is a motor.

7. The induction lamp of claim 5, wherein the movable lamp cover comprises a main body and a plurality of movable leaf-shaped sheets; the illuminating unit is fixed to a bottom of the main body, and is surrounded by the movable leaf-shaped sheets; one end of each leaf-shaped sheet is rotatably fixed to the main body and the other end of each leaf-shaped sheet is free, and can be driven by the driver to open to expose the illuminating unit.

8. The induction lamp of claim 7, wherein in a closed state, each two adjacent movable leaf-shaped sheets define a gap for the light from the illuminating unit to pass through.

* * * * *